June 8, 1926.
O. H. LUDEMAN
1,587,969
VALVE MECHANISM
Filed Sept. 25, 1925
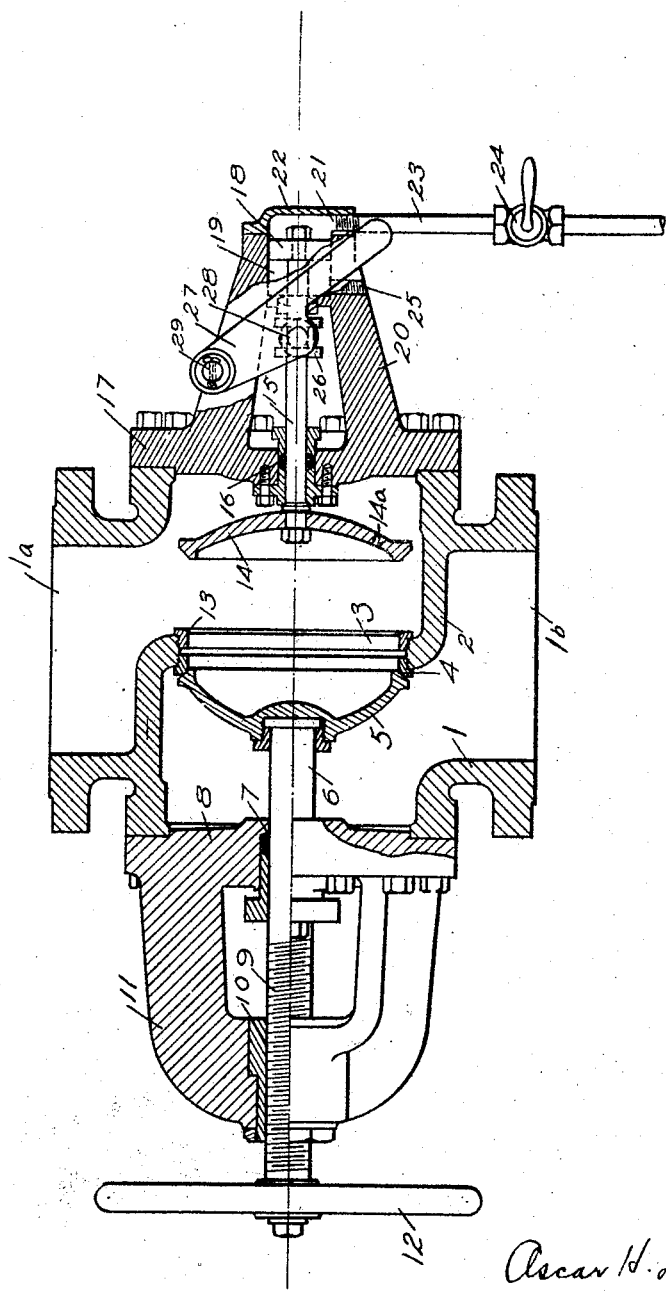
Inventor
Oscar H. Ludeman
Attorney Patented June 8, 1926.

1,587,969

UNITED STATES PATENT OFFICE.

OSCAR H. LUDEMAN, OF GLEN RIDGE, NEW JERSEY, ASSIGNOR TO LUDEMAN BROTHERS INCORPORATED, OF NEW YORK, N. Y., A CORPORATION OF NEW YORK.

VALVE MECHANISM.

Application filed September 25, 1925. Serial No. 58,547.

This invention is designed to improve valves in which there is a normally operating valve, such as a throttle valve, and an auxiliary or emergency shut-off valve which operates in connection with the throttle valve. With such valves when the emergency valve has been operated and this succeeded by the closing of the normally actuated valve it has been necessary to reset the emergency valve for a continued operation. With the present invention the construction is such that a means is provided whereby the emergency valve upon the closing of the throttle valve automatically resets itself so that upon the opening of the throttle valve in the usual manner the parts are in position for continued use. Features and details of the invention will appear from the specification and claims.

The invention is illustrated in the accompanying drawing which shows a central section through a valve.

1 marks the body of the valve having the inlet 1ª and discharge 1ᵇ separated by the usual diaphragm 2 having a valve opening 3 therethrough. A seat 4 is arranged on the diaphragm for the normally operated, or throttle valve 5. This valve is provided with a stem 6 extending through a stuffing box 7 in the cap 8. The stem has screw threads 9 operating in screw threads 10 of a yoke 11 carried by the cap. The stem is provided with the usual operating handle 12.

A seat 13 is arranged directly opposite and concentric with the seat 4 and the emergency or auxiliary valve 14 operates on the seat 13, these two valves closing the space formed by the opening or passage 3. A stem 15 is secured to the valve head 14 and extends through a stuffing box 16 in the cap 17 of the valve body. The stem terminates in a piston 18. The piston operates in a cylinder 19 carried by a yoke 20 mounted on the cap 17. A supply passage 21 is arranged in a head 22 and leads to the cylinder. A supply pipe 23 leads to the passage 21 and is supplied with a controlling valve 24.

When it is desired to close the emergency valve, the valve 24 is opened admitting fluid under pressure to the cylinder and forcing the valve to closed position. The valve 14 is provided with a small opening 14ª so that immediately the valve head 5 is closed the space between the valve heads is filled with fluid through the passage 14ª so that the fluid pressure at the opposite sides of the valve head 14 is balanced. When this happens there is a preponderance of effective pressure on the inner side of the valve head due to the area occupied by the stem 15 on the outside of the valve and the valve is forced outwardly through the pressure in the body by reason of the unbalanced condition incident to the presence of stem. The emergency valve, therefore, automatically resets itself upon the closing of the throttle valve so that no further attention is required in the operation of the valve, it being, of course, understood that the supply to the cylinder 19 is cut off prior to the closing of the throttle valve.

While I have shown merely a manually actuated valve for controlling the supply, it will be understood that this may be and usually is automatically controlled through some emergency controlling mechanism.

A second passage 25 leads from the cylinder 19. This operates as the exhaust for the cylinder and by restricting it the same cylinder that closes the valve may thus be utilized to provide the dash pot for the valve.

A spool 26 is fixed on the stem and a manually operated lever 27 is connected by pin 28 with the spool. The lever is pivoted on the yoke 20 at 29. This affords a convenient means for a direct or manual operation of the emergency valve.

What I claim as new is:—

1. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; and means associated with the second head to cause automatic opening of the second head upon the balancing of pressure in said space.

2. In a valve mechanism, the combination of a fluid conduit having two opposing concentric seats having an intervening space between them; a first valve head closing on one seat; a second valve head closing on the other of said seats; means permitting a balancing of pressure in said space upon the closing of both of said valves with the pressure at the opposite side of the second valve head; and means associated with the second valve head to cause automatic opening of the second head upon the balancing of pressure in said space.

3. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; and means associated with the second head unbalancing the effective pressures acting on the second valve head to open the same.

4. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; a stem extending from the second valve head; and means operating through the stem to close the valve, said stem providing an unbalanced area upon the second valve head.

5. In a valve mechanism, the combination of a fluid conduit having two opposing concentric seats having an intervening space between them; a first valve head closing on one seat; a second valve head closing on the other of said seats; means permitting a balancing of pressure in said space upon the closing of both of said valves with the pressure at the opposite side of the second valve head; a stem extending from the second valve head; and means operating through the stem to close the valve, said stem providing an unbalanced area upon the second valve head.

6. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; a stem extending from the second valve head; and means operating through the stem to close the valve comprising a fluid-actuated pressure device, said stem providing an unbalanced area upon the second valve head.

7. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; a stem extending from the second valve head; and means operating through the stem to close the valve comprising a fluid-actuated pressure device and a manually actuated device, said stem providing an unbalanced area upon the second valve head.

8. In a valve mechanism, the combination of a fluid conduit having two seats having an intervening space between them; a first valve head closing on one seat; a second valve head closing on the other of said seats; means permitting a balancing of pressure in said space upon the closing of both of said valves with the pressure at the opposite side of the second valve head; a stem extending from the second valve head; and means operating through the stem to close the valve comprising a cylinder, a piston in the cylinder, means for supplying fluid to the cylinder to actuate the valve, and a restricted opening leading from the cylinder at the exhaust side of the cylinder to retard the closing action of the piston.

In testimony whereof I have hereunto set my hand.

OSCAR H. LUDEMAN.